US007365311B1

(12) United States Patent
Cetto

(10) Patent No.: US 7,365,311 B1

(45) Date of Patent: Apr. 29, 2008

(54) ALIGNMENT OF MASS SPECTROMETRY DATA

(75) Inventor: Lucio Cetto, Boston, MA (US)

(73) Assignee: The MathWorks, Inc., Natick, MA (US)

( * ) Notice: Subject to any disclaimer, the term of this patent is extended or adjusted under 35 U.S.C. 154(b) by 408 days.

(21) Appl. No.: 11/221,474

(22) Filed: Sep. 8, 2005

(51) Int. Cl.
*H01J 49/00* (2006.01)
*G06F 19/00* (2006.01)

(52) U.S. Cl. .......................... 250/282; 702/23; 702/30; 702/85; 702/76; 436/173

(58) Field of Classification Search ..................... None
See application file for complete search history.

(56) References Cited

U.S. PATENT DOCUMENTS

2006/0020401 A1* 1/2006 Davis et al. .................. 702/30

OTHER PUBLICATIONS

Jeffries, Neal, "Algorithms for alignment of mass spectrometry proteomic data," *Bioinformatics*, vol. 21(14):3066-3073 (2005).

Sauve, Anne C. et al, "Normalization, Baseline Correction and Alignment of High-throughput Mass Spectrometry Data," Department of Statistics, University of California, Berkeley, Division of Genetics and Bioinformatics, The Walter and Eliza Hall Institute, Australia, pp. 1-4.

* cited by examiner

*Primary Examiner*—Jack I. Berman
*Assistant Examiner*—Zia R. Hashmi
(74) *Attorney, Agent, or Firm*—Lahive & Cockfield, LLP

(57) ABSTRACT

Methods, systems and mediums are disclosed for aligning mass spectrometry data before the analysis of the mass spectrometry data. The mass spectrometry data may be received from a mass spectrometry machine, and re-sampled using a smooth warping function. To estimate the warping function, a synthetic signal is build using, for example, Gaussian pulses centered at a set of reference peaks. The reference peaks may be designated by users or calculated after observing a group of spectrograms. The synthetic signal is shifted and scaled so that the cross-correlation between the mass spectrometry data and the synthetic signal reaches its maximum value.

36 Claims, 6 Drawing Sheets

ALIGNMENT OF MASS SPECTROMETRY DATA

TECHNICAL FIELD

The present invention generally relates to data processing and more particularly to methods, systems and mediums for the analysis and enhancement of mass spectrometry data.

BACKGROUND INFORMATION

Mass spectrometry is a state-of-the-art tool for determining the masses of molecules present in a biological sample. A mass spectrum consists of a set of mass-to-charge ratios, or m/z values and corresponding relative intensities that are a function of all ionized molecules present in a sample with that mass-to-charge ratio. The m/z value defines how a particle will respond to an electric or magnetic field, which can be calculated by dividing the mass of a particle by its charge. A mass-to-charge ratio is expressed by the dimensionless quantity m/z where m is the molecular weight, or mass number, and z is the elementary charge, or charge number. Mass spectrometry provides information on the mass to charge ratio of a molecular species in a measured sample. The mass spectrum observed for a sample is thus a function of the molecules present. Conditions that affect the molecular composition of a sample should therefore affect its mass spectrum. As such, mass spectrometry is often used to test for the presence or absence of one or more molecules. The presence of such molecules may indicate a particular condition such as a disease state or cell type. By comparing mass spectra obtained from blood, serum, tissue or some other source, of patients with a disease against mass spectra from healthy patients, clinicians hope to be able to detect, discover, or identify markers for disease and create diagnostic or prognostic tools that can be used to detect or confirm the presences of a disease.

One of the mass spectrometry technologies involved in quantitative analysis of protein mixtures is known as surface-enhanced laser desorption/ionization—time of flight (SELDI-TOF). This technique utilizes stainless steel or aluminum-based supports, or chips, engineered with chemical or biological bait surfaces of 1-2 mm in diameter. These varied chemical and biochemical surfaces allow differential capture of proteins based on the intrinsic properties of the proteins themselves. SELDI-TOF produces patterns of masses rather than actual protein identifications. These mass spectral patterns are used to differentiate patient samples from one another, such as diseased from normal. Recent development with SELDI-TOF mass spectrometry has shown promising results for prognostics and diagnostics of cancer by analyzing proteomic patterns in biological fluids. The comparative profiling in the SELDI-TOF mass spectrometry enables the users to potentially discover novel proteins that play an important role in the disease pathology and regulation factors, and hence to predict cancer on the basis of mass/charge intensities that correspond to peptides.

Although the high-throughput detector used in the mass spectrometry can generate numerous spectra per patient, undesirable variation may get introduced in the mass spectrometry data due to the non-linearity in the detector response, ionization suppression, minor changes in the mobile phase composition and interaction between analytes. Additionally, the resolution of the peaks usually changes for different experiments and also varies towards the end of the spectrogram. FIG. 1 shows low resolution unaligned spectrograms. The first and second spectrograms 110 and 120 are produced using a mass spectrometry machine. The third and fourth spectrograms 130 and 140 are produced using another mass spectrometry machine. FIG. 1 shows that the first and second spectrograms 110 and 120 are unaligned with the third and fourth spectrograms 130 and 140 by the amount 150 due to the non-linearity of the mass spectrometry machines. Therefore, it is necessary to correct the irregularities of the spectrograms before performing any comparative analysis on the signals. These steps are usually referred as "pre-processing" and encompass signal background subtraction, normalization, smoothing (or filtering) and signal alignment.

SUMMARY OF THE INVENTION

The present invention provides methods, systems and mediums for processing mass spectrometry data. The present invention preprocesses the mass spectrometry data before the analysis of the data to align the peaks of the mass spectrometry data. The mass spectrometry data may be received from a mass spectrometry machine, and re-sampled using a smooth warp function. An illustrative embodiment of the present invention uses a first order polynomial ($f(x)=A+Bx$) for the warp function. Estimating a first order polynomial involves estimating two variables, for example, shifts and scaling, which may map the observed mass-to-charge ratios (m/z values) to new m/z values. This warp function is then used to resample the spectrograms.

To estimate the warp function, the present invention builds a synthetic signal using, for example, Gaussian pulses centered at a set of reference peaks. The reference peaks may be designated by users or calculated after observing multiple spectra. The synthetic signal is shifted and scaled so that the cross-correlation between the mass spectrometry data and the synthetic signal reaches its maximum value. The maximization of the cross-correlation is an objective function associated with an optimization problem. The optimization problem may be solved by performing a multi-resolution exhaustive search over an initial grid with predetermined steps of shifts and scales. The objective function may be evaluated at every possible point in the initial grid. After finding a point in the initial grid where the objective function produces a maximum value, a new search grid may be built with smaller steps of shifts and scales around the temporal optimal point. The objective function is re-evaluated at the points in the new grid to find a point in the new grid where the objective function produces a maximum value. The creation of a new grid and the search over the new grid may be repeated several times until the resolution of the new grid is sufficiently small.

The present invention may employ higher order polynomials or other warp functions, as long as they are smooth and parametric. In the higher order warp function, the optimization technique may adapt to higher order functionals. For example, a quadratic function may require a cubic grid instead of a planar grid. The multi-resolution exhaustive search is illustrative and the maximum value of the cross-correlation may also be searched using other algorithms, such as genetic algorithms and direct search algorithms.

In one aspect of the present invention, a method is provided for aligning original spectrum data to a set of reference peaks. The method includes the step of building synthetic spectrum data with pulses centered at the reference peaks. The method also includes the step of shifting and scaling the synthetic spectrum data so that cross-correlation between the original spectrum data and the synthetic spectrum data is a maximum value over shifts and scales.

In another aspect of the present invention, a system is provided for aligning original spectrum data to a set of reference peaks. The system includes a preprocessor for building synthetic spectrum data with pulses centered at the reference peaks. The preprocessor shifts and scales the synthetic spectrum data so that cross-correlation between the original spectrum data and the synthetic spectrum data is a maximum value over shifts and scales.

In another aspect of the present invention, a medium holding instructions executable in an electronic device is provided for a method for aligning original spectrum data to a set of reference peaks. The method includes the step of building synthetic spectrum data with pulses centered at the reference peaks. The method also includes the step of shifting and scaling the synthetic spectrum data so that cross-correlation between the original spectrum data and the synthetic spectrum data is a maximum value over shifts and scales.

By using raw data, not just peak information, to align the peaks of the mass spectrometry data, the present invention prevents the failure of the alignment of mass spectrometry data caused by the defective peak determination.

BRIEF DESCRIPTION OF THE DRAWINGS

The foregoing and other objects, aspects, features, and advantages of the invention will become more apparent and may be better understood by referring to the following description taken in conjunction with the accompanying drawings, in which.

DETAILED DESCRIPTION

Figure 1:
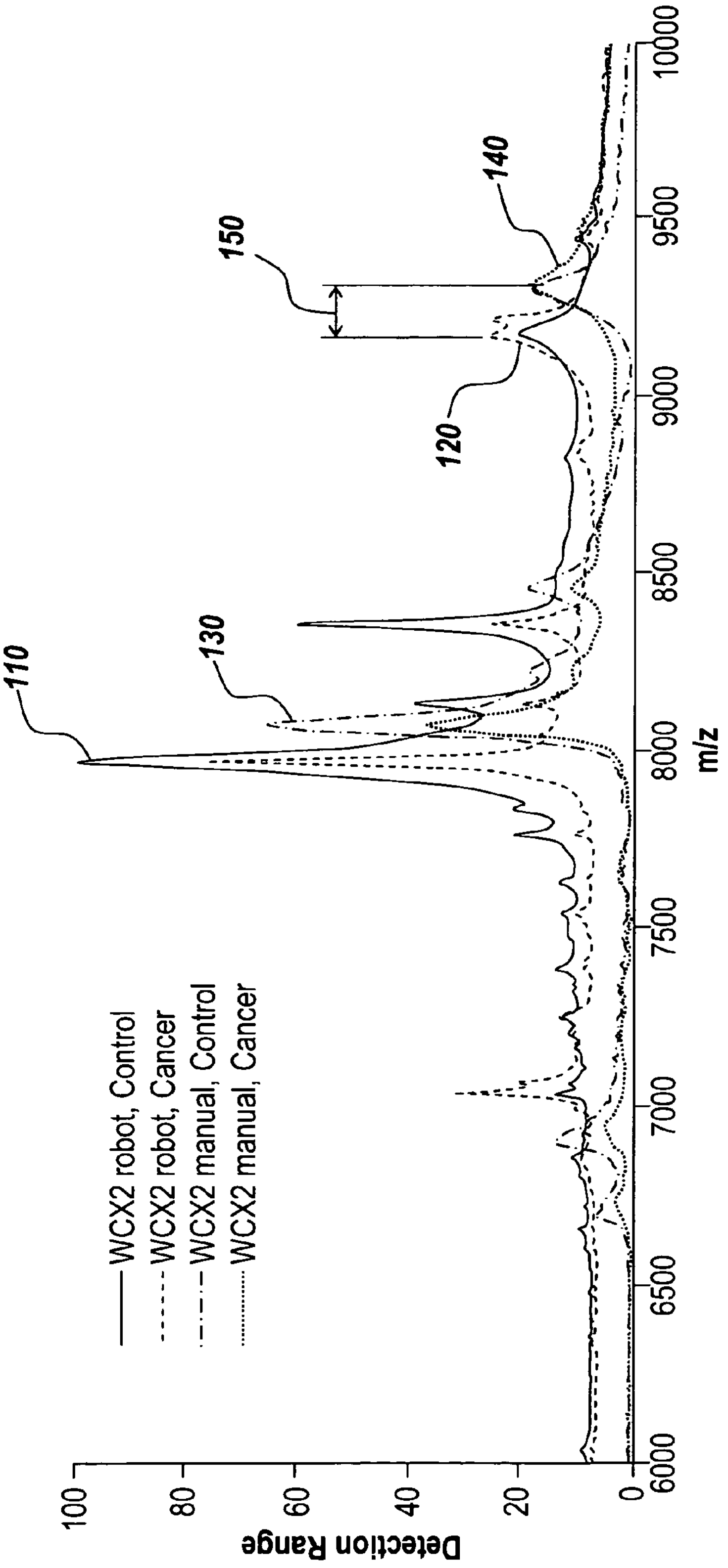
FIG. 1 depicts exemplary unaligned spectrograms.

Certain embodiments of the present invention are described below. It is, however, expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The illustrative embodiment of the present invention preprocesses mass spectrometry data before the analysis of the data. In the illustrative embodiment, the mass spectrometry data is preprocessed in the MATLAB® environment, which is provided from The MathWorks, Inc. of Natick, Mass. MATLAB® is an intuitive high performance language and technical computing environment. MATLAB® provides mathematical and graphical tools for data analysis, visualization and application development. MATLAB® integrates computation and programming in an easy-to-use environment where problems and solutions are expressed in familiar mathematical notation. MATLAB® is an interactive system whose basic data element is an array that does not require dimensioning. This allows users to solve many technical computing problems, especially those with matrix and vector formulations, in a fraction of the time it would take to write a program in a scalar non-interactive language, such as C and FORTRAN.

MATLAB® provides application specific tools, such as Bioinformatics Toolbox, that can be used in the MATLAB® environment. In particular, the Bioinformatics Toolbox offers computational molecular biologists and other research scientists an open and extensible environment in which to explore ideas, prototype new algorithms, and build applications in drug research, genetic engineering, and other genomics and proteomics projects. The Bioinformatics Toolbox provides access to genomic and proteomic data formats, analysis techniques, and specialized visualizations for genomic and proteomic sequence and micro-array analysis. Most functions in the Bioinformatics Toolbox are implemented in the open MATLAB® language, enabling the users to customize the algorithms or develop their own.

The illustrative embodiment will be described solely for illustrative purposes relative to the MATLAB® environment. Although the illustrative embodiment will be described relative to MATLAB® environment, one of ordinary skill in the art will appreciate that the present invention may be implemented in other environments, such as computing environments using software products of LabVIEW® or MATRIXx from National Instruments, Inc., or Mathematica® from Wolfram Research, Inc., or Mathcad of Mathsoft Engineering & Education Inc., or Maple™ from Maplesoft, a division of Waterloo Maple Inc.

In the illustrative embodiment of the present invention, the mass spectrometry data is preprocessed to align the peaks of the mass spectrometry data. The mass spectrometry data may be received from a mass spectrometry machine, or loaded from storage. The mass spectrometry data is to be re-sampled using a smooth warp function. The illustrative embodiment of the present invention uses a first order polynomial as the warping function. One of ordinary skill in the art will appreciate that the first order polynomial is an illustrative warp function and higher order polynomials or other warp functions can be used as long as they are smooth and parametric.

Estimating a first order polynomial involves estimating two variables, for example shift and scaling, which may map the observed mass-to-charge ratios (m/z values) to new m/z values. The warp function is estimated from the observed data as follows: First, the illustrative embodiment creates a synthetic signal with Gaussian pulses centered at a set reference peaks. One of ordinary skill in the art will appreciate that the Gaussian pulse is illustrative and the synthetic signal can be built with any type of pulses, such as the Laplacian pulses, as long as the pulse has its maximum value at a center position and its values approximate to zero as it moves away from the center position.

A set of reference peaks is designated in the illustrative embodiment. The illustrative embodiment designates at least two reference peaks. But the present invention may use any number of reference peaks. Using a single reference peak may produce a poor alignment. If only one reference peak is used, only the shift can be estimated, and this may be a special case of the present invention. The more reference peaks are designated, the better alignment of the spectrogram is produced as long as the reference peaks are expected to appear at a fixed m/z values in the experimental spectrograms.

The reference peaks may be designated by a user or determined by calculation after observing a group of spectrograms. The synthetic signal is shifted and scaled so that the cross-correlation between the input mass spectrometry data and the synthetic signal reaches its maximum value. The maximization of the cross-correlation is the objective function for the optimization problem. In the illustrative embodiment, two variables need to be estimated, the shift and the scaling. To solve the optimization problem, the illustrative embodiment performs a multi-resolution exhaustive search. For example, an initial two dimensional grid is built over the range of expected worst shift and scaling cases. The objective function is evaluated over every possible point in the grid, and after finding a point in the grid where the objective function has a maximum value, a new search grid with smaller steps is built around the temporal optimal. The creation of a new grid and the search over the new grid is repeated several times until the resolution of the new grid is sufficiently small.

In the higher order warp function, the optimization technique may adapt to higher order functionals. For example, a quadratic function may require a cubic grid instead of a planar grid. One of ordinary skill in the art will appreciate that the multi-resolution exhaustive search is illustrative and the maximum value of the cross-correlation may be searched using other algorithms, such as genetic algorithms and direct search algorithms.

The illustrative embodiment may operate in a "fast" mode for computing the cross-correlation of the signal. Since the synthetic signal is zero valued for most of the MZ vector, most of the multiplications during the estimation of the cross-correlation can be eliminated achieving significant speedup over the full mode cross-correlation.

Figure 2:
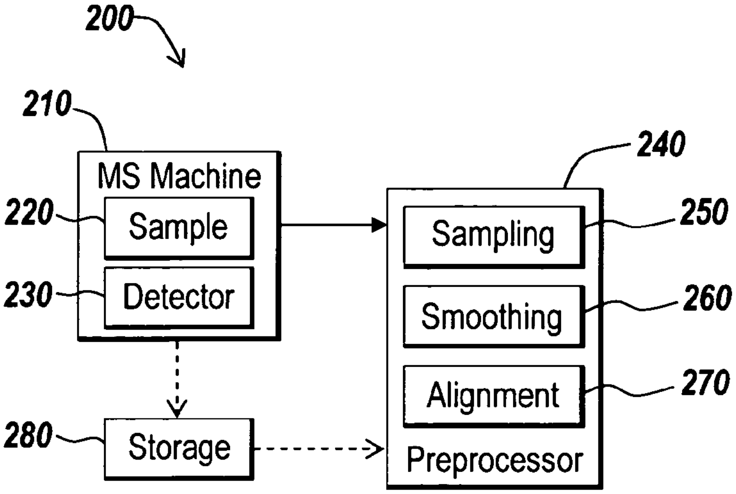
FIG. 2 depicts an exemplary mass spectrometry system utilized in the illustrative embodiment of the present invention.

FIG. 2 depicts an exemplary mass spectrometry system 200 suitable for practicing the illustrative embodiment of the present invention. The mass spectrometry system 200 includes a mass spectrometry (MS) machine or mass spectrometer 210 and a preprocessor 240. The MS machine 210 is an instrument that measures the masses of individual molecules that have been converted into ions, i.e., molecules that have been electrically charged. Since molecules are so small, it is not convenient to measure their masses in kilograms, or grams, or pounds. The mass spectrometer 210 measures the mass-to-charge ratio (m/z) of the ions formed from the molecules. The charge on an ion is denoted by the integer number z of the fundamental unit of charge.

The MS machine 210 may include an inlet for the sample 220, which may be a solid, liquid, or vapor, to enter the mass spectrometer 210. Depending on the ionization techniques used, the sample 220 may already exist as ions in solution, or it may be ionized in conjunction with its volatilization or by other methods. The gas phase ions are sorted according to their mass-to-charge (m/z) ratios and then collected by a detector 230. In the detector 230, the ion flux is converted to a proportional electrical current. The magnitude of these electrical signals is recorded as a function of m/z and converted into a mass spectrum. One of ordinary skill in the art will appreciate that the MS machine 210 may be of various types utilizing various techniques. For example, the MS machine 170 may utilize surface-enhanced laser desorption/ionization—time of flight (SELDI-TOF) techniques, which are described above in the "Background Information" portion. Those skilled in the art will appreciate that the algorithm of the present invention is applicable to other types of mass-spectrometry technologies, such as matrix assisted laser desorption Ionization—time of flight (MALDI-TOF) techniques, liquid chromatography (LC) techniques and Electro-spray Ionization techniques.

The preprocessor 240 receives the mass spectrometry data from the MS machine 210 and preprocesses the mass spectrometry data before performing the analysis of the mass spectrometry data. Alternatively, the preprocessor 240 may receive the mass spectrometry data from the storage facility 280 that stores the mass spectrometry data generated in the MS machine 210. The storage facility 280 may be any types of movable mediums, or mediums coupled to the preprocessor 240 directly or via a network. The preprocessor 240 may include a unit 250 for sampling the mass spectrometry data, a unit 260 for smoothing or filtering the mass spectrometry data, and a unit 270 for aligning the mass spectrometry data. One of ordinary skill in the art will appreciate that these units are illustrative and the preprocessor 240 may include different units depending on the purpose of the preprocessor 240. The preprocessor 240 is described below in more detail with reference to FIG. 3.

Figure 3:
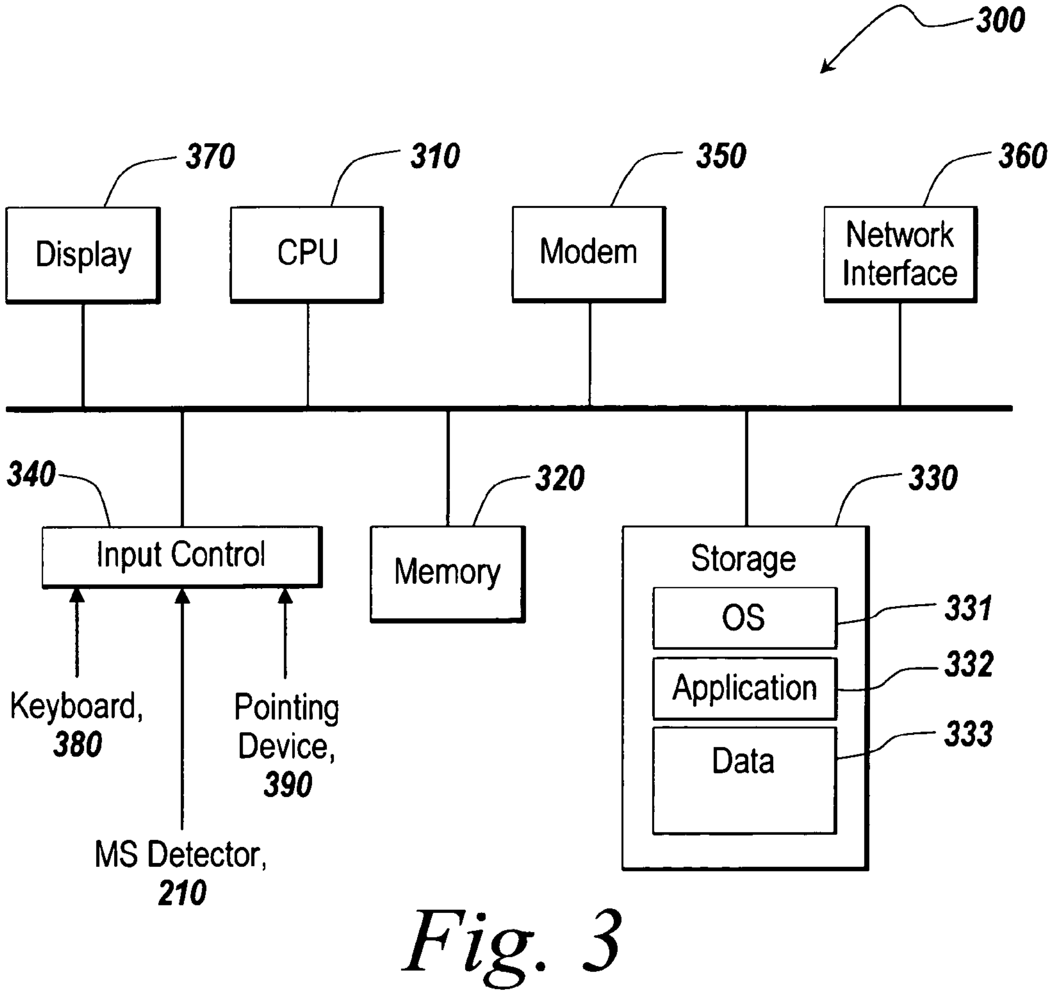
FIG. 3 is a block diagram of a computing device for implementing the preprocessor depicted in FIG. 2.

FIG. 3 is an exemplary computational device 300 suitable for implementing the preprocessor 240 in the illustrative embodiment of the present invention. One of ordinary skill in the art will appreciate that the computational device 300 is intended to be illustrative and not limiting of the present invention. The computational device 300 may take many forms, including but not limited to a workstation, server, network computer, quantum computer, optical computer, bio computer, Internet appliance, mobile device, a pager, a tablet computer, and the like.

The computational device 300 may be electronic and include a Central Processing Unit (CPU) 310, memory 320, storage 330, an input control 340, a modem 350, a network interface 360, a display 370, etc. The CPU 310 controls each component of the computational device 300 to process the mass spectrometry data. The memory 320 temporarily stores instructions and data and provides them to the CPU 310 so that the CPU 310 operates the computational device 300. The input control 340 may interface with a keyboard 380, a mouse 390, and other input devices including the MS machine 210. The computational device 300 may receive through the input control 340 the mass spectrometry data as well as other input data necessary for preprocessing the mass spectrometry data, such as reference peaks to which the mass spectrometry data is aligned. The computational device 300 may display the mass spectrometry data in the display 370.

The storage 330 usually contains software tools for applications. The storage 330 includes, in particular, code 331 for the operating system (OS) of the device 300, code 332 for applications running on the operation system, and code 333 for the mass spectrometry data. The mass spectrometry data may be stored, for example, in text file format with two elements, the mass/charge ratio (m/z) values and the intensity values corresponding to the m/z ratios. The applications running on the operation system may include functions for preprocessing the mass spectrometry data, such as a function implementing the unit 250 for sampling the mass spectrometry data, a function implementing the unit 260 for smoothing or filtering the mass spectrometry data, and a function implementing the unit 270 for aligning the mass spectrometry data. One of ordinary skill in the art will appreciate that the units 250-270 may be implemented in hardware or the combination of hardware and software in other embodiments. One of ordinary skill in the art will also appreciate that the algorithm of the present invention may also be built into or embedded in the mass-spectrometer 210.

Figure 4:
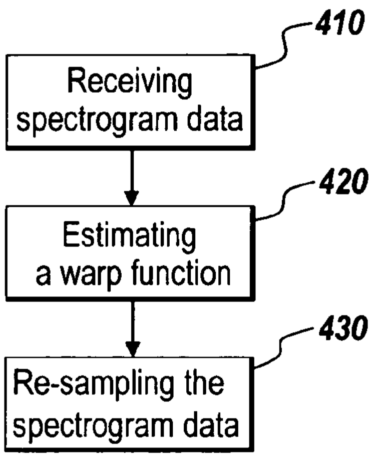
FIG. 4 is a flow chart showing an exemplary operation of the preprocessor to align the mass spectrometry data.

FIG. 4 is a flow chart illustrating an exemplary operation for preprocessing the mass spectrometry data. The preprocessor 240 receives the mass spectrometry data from the MS machine 210 (step 410) and stores the mass spectrometry data in storage 330. The mass spectrometry data may include at least two elements, the mass/charge ratio (m/z) values and the intensity values corresponding to the m/z ratios. Based on the mass spectrometry data, the alignment unit 270 computes or calculates a warp function that is used to map the mass-to-charge ratios (m/z values or m/z vectors) to new m/z values or m/z vectors aligning the peaks of the mass spectrometry data (step 420). The illustrative embodiment uses a first order polynomial as the warp function. One of ordinary skill in the art will appreciate that the first order polynomial is illustrative and the warp function can be any high order polynomials or other warp functions, as long as they are smooth and parametric. The estimation of the warp function will be described below in more detail with reference to FIG. 5.

After estimating the warp function, the preprocessor 240 loads the mass spectrometry data and enables the sampling unit 250 to re-sample the mass spectrometry using the warp function (step 430). The warp function may shift and scale the mass/charge (m/z) value of the observed spectrometry data to align the peaks of the spectrometry data to reference peaks. When the mass spectrometry data includes multiple spectrograms, these steps are repeated for each spectrogram. The estimation of the warp function for each spectrogram can be performed over a cluster of computers. The distributed implementation of the present invention will be described below with reference to FIG. 7.

Figure 5:
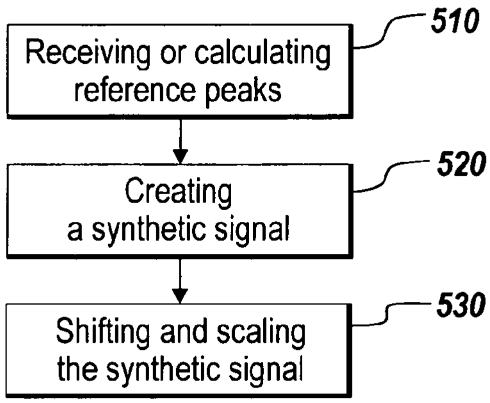
FIG. 5 is a flow chart showing an exemplary operation of the preprocessor for calculating a warp function of mass spectrometry data.

FIG. 5 is a flow chart illustrating an exemplary operation for estimating the warp function in the illustrative embodiment. Estimating a first order polynomial (f(x)=A+Bx) involves estimating two variables, shift and scaling in the illustrative embodiment, which map the mass-to-charge ratios (m/z vectors) of the observed mass spectrometry data to new m/z vectors. The preprocessor 240 may receives a set of reference peaks entered by a user (step 510). In the illustrative embodiment, the user may be provided with a user interface that enables the user to designate reference peaks. The illustrative embodiment requires at least two reference peaks. But the present invention can use any number of reference peaks. Using a single reference peak may produce a poor alignment. If only one reference peak is used, only the shift can be estimated, and this may be a special case of the present invention. In multiple spectra, the processor 240 may calculate the reference peaks after observing the multiple spectra. The reference peaks may be determined to make minimum the total amount of peak shifts of the spectra to the reference peaks.

The alignment unit 270 builds a synthetic spectrum with Gaussian pulses centered at the reference peaks (step 520). An exemplary synthetic spectrum can be represented by the following equation.

$$f(x)=\Sigma\exp[-(x-x_p)^2/\partial]$$

x is the mass to charge ratio (m/z), $x_p$ is the mass to charge ratio (m/z) of the peak of a Gaussian pulse, and $\partial$ is the width of a Gaussian pulse. The width of a Gaussian pulse is set to be narrow enough to ensure that close peaks in the spectrum are not included with the reference peaks. The width of the Gaussian pulse is also set to be wide enough to ensure that the pulse captures a peak which is off the expected site. Tuning the spread of the Gaussian pulses controls a tradeoff between robustness (wider pulses) and precision (narrower pulses). The width of the Gaussian pulses does not affect the shape of the peaks in the spectrum. The user may set a different width for each Gaussian pulse since the spectrogram resolution changes along the mass/charge value. One of ordinary skill in the art will appreciate that the Gaussian pulse is illustrative and the synthetic signal can be built with any type of pulses, such as the Laplacian pulse, as long as the pulse has its maximum value at a center position and its values approximate to zero as it moves away from the center position.

The processor 240 allows the user to give weights to each reference peak. Peak weights are used to emphasize peaks so that although the intensity of the peaks is small, the peaks provide a consistent mass/charge value and appear with good resolution in the spectrograms. The mass/charge value of the synthetic spectrum is shifted and scaled so that the cross-correlation between the mass spectrometry data and the synthetic spectrum becomes a maximum value (step 530). The preprocessor 240 adjusts the mass/charge values while preserving the shape of the mass spectrometry data.

Figure 6:
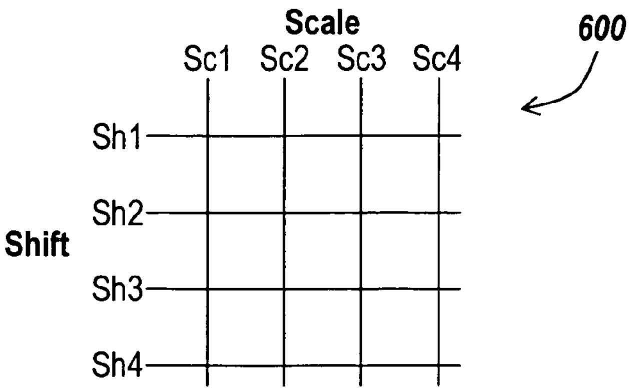
FIG. 6 is an exemplary two dimensional grid used in the illustrative embodiment.

Cross-correlation is a method of estimating the degree to which two signals or spectra are correlated. The maximization of the cross-correlation is an objective function associated with an optimization problem. The optimization problem may be solved by performing a multi-resolution exhaustive search over an initial grid with predetermined steps of shifts and scales. The objective function may be evaluated at every possible point in the initial grid. FIG. 6 depicts an exemplary two dimensional grid 600 over which a search is conducted to find a maximum value of the objective function. The possible shifts (Sh1, Sh2, Sh3 and Sh4) and scales (Sc1, Sc2, Sc3 and Sc4) are predetermined and the objective function is calculated per each combination of the shifts (Sh1, Sh2, Sh3 and Sh4) and scales (Sc1, Sc2, Sc3 and Sc4).

After finding a point in the grid 600 where the objective function produces a maximum value, a new search grid may be built with smaller steps of shifts and scales around the temporal optimal point. The objective function is re-evaluated at the points in the new grid to find a point in the new grid where the objective function produces a maximum value. The creation of a new grid and the search over the new grid may be repeated several times until the resolution of the new grid is sufficiently small. One of skill in the art will appreciate that the two dimensional grid is illustrative and the present invention may employ a grid of more than two dimensions with additional parameters. One of ordinary skill in the art will also appreciate that the grid search algorithm is also illustrative and other optimization algorithms, such as genetic algorithms and direct search, may apply to find the maximum value of the cross-correlation.

In multiple spectra, the cross-correlation is evaluated per the warp function of each spectrum. The evaluation of the cross-correlation for each spectrum can be performed over a cluster of computers in a distributed manner. The distributed implementation of the present invention will be described below with reference to FIG. 7.

Figure 7:
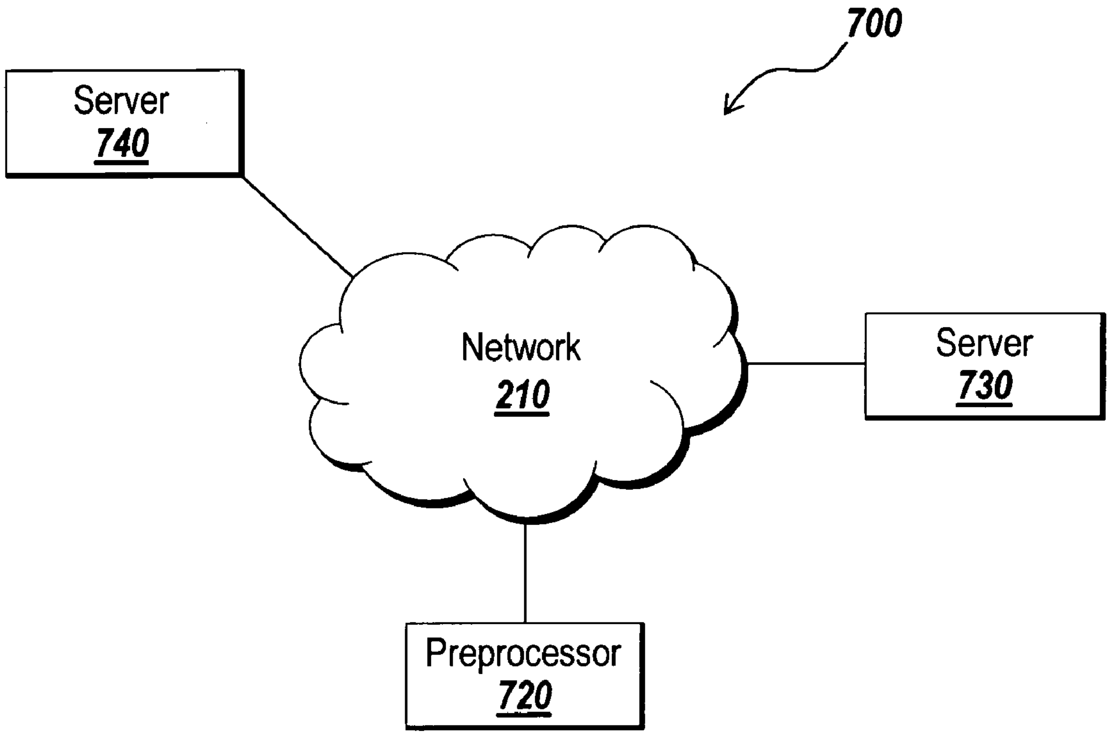
FIG. 7 is an exemplary network environment for the distributed implementation of the present invention.

FIG. 7 is an exemplary network environment 700 suitable for the distributed implementation of the illustrative embodiment. The network environment 700 may include one or more servers 730 and 740 coupled to the preprocessor 720 via a communication network 710. The servers 730 and 740 need to have at least some computational abilities to execute the tasks requested by the preprocessor 720. The servers 730 and 740 do not need to include every element of the preprocessor described above with reference to FIGS. 2 and 3. The network interface 360 and the modem 350 of the preprocessor 720 enable the preprocessor 720 to communicate with the servers 730 and 740 through the communication network 710. The communication network 710 may include Internet, intranet, LAN (Local Area Network), WAN (Wide Area Network), MAN (Metropolitan Area Network), etc. The communication facilities can support the distributed implementations of the present invention.

In the network environment 200, the preprocessor 720 may request the servers 730 and 740 to perform repeated calculations, such as the calculation of warp functions or the cross-correlation between the warp functions and the mass spectrometry data, for multiple spectra. The servers 730 and 740 may execute the requested tasks and return the results to the preprocessor 720. By using the computational capabilities of the servers 730 and 740 coupled to the network 710, the preprocessor 720 may speed up the calculation of the warp functions or the cross-correlations for multiple spectra. One of skill in the art will appreciate that the distributed computing system described above is illustrative and not limiting the scope of the present invention. Rather, another embodiment of the present invention may implement different computing system, such as serial and parallel technical computing systems, which are described in more detail in pending U.S. patent application Ser. No. 10/896,784 entitled "METHODS AND SYSTEM FOR DISTRIBUTING TECHNICAL COMPUTING TASKS TO TECHNICAL COMPUTING WORKERS," which is incorporated herewith by reference.

Figure 8A:
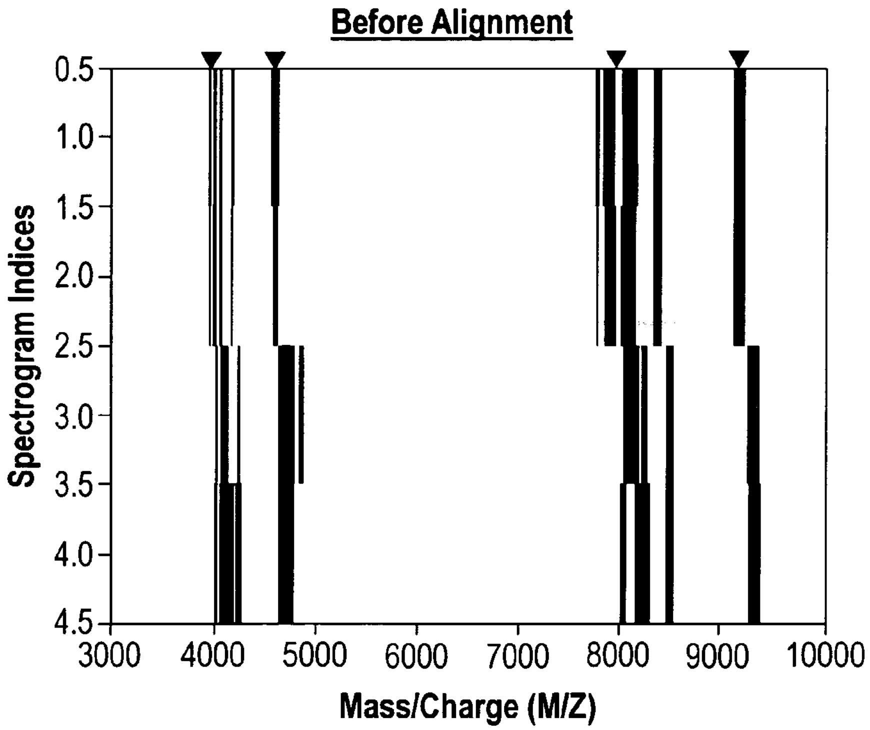
FIG. 8A is a top view of the spectrograms before alignment.
Figure 8B:
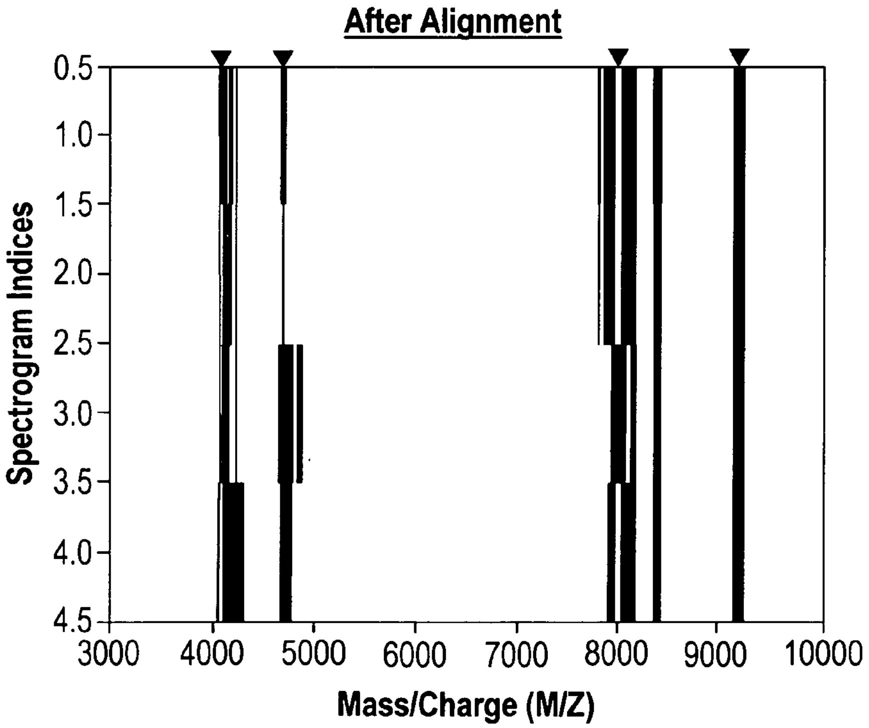
FIG. 8B is a top view of the spectrograms after alignment.
Figure 9A:
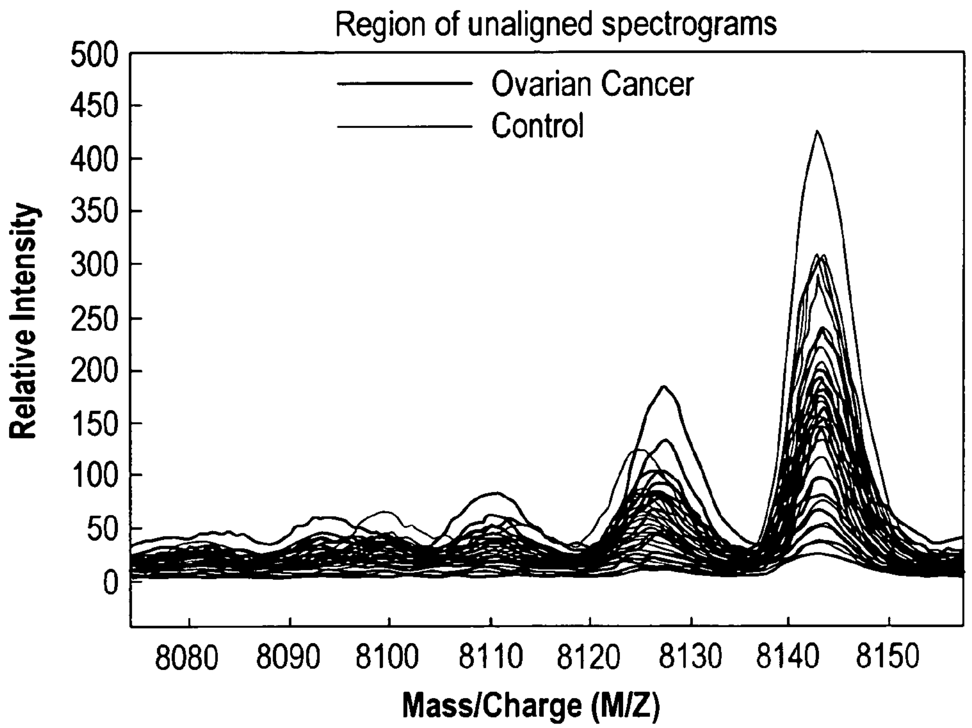
FIG. 9A shows high resolution spectrograms before alignment.
Figure 9B:
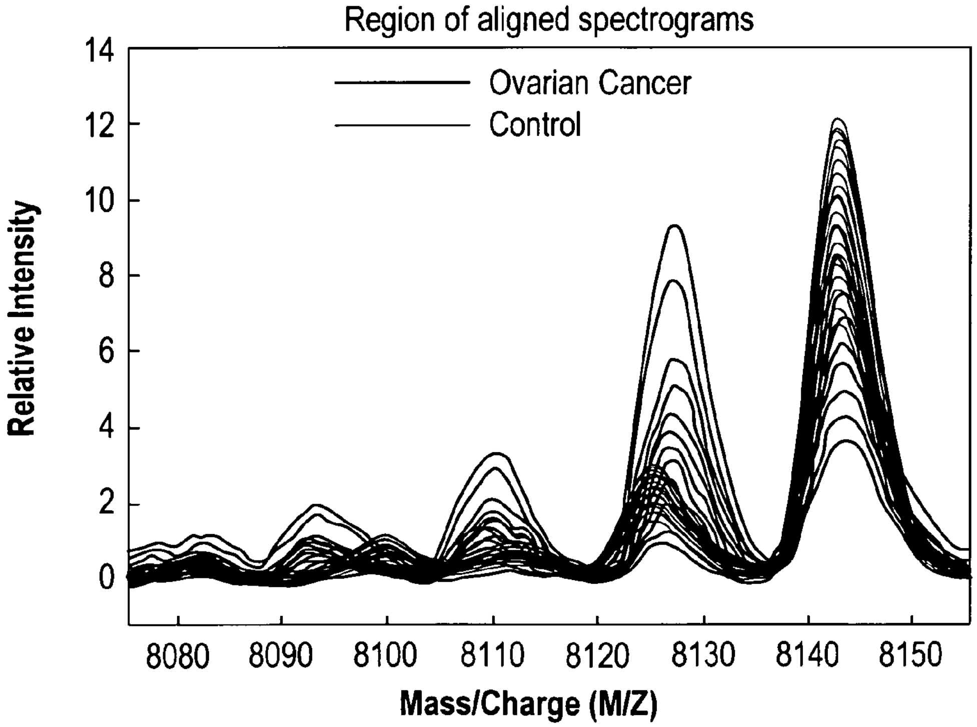
FIG. 9B shows high resolution spectrograms after alignment.

FIG. 8A shows the top view of the spectrograms depicted in FIG. 1. The two upper spectrograms correspond to the first and second spectrograms 110 and 120, and the two lower spectrograms correspond to the third and fourth spectrograms 130 and 140. FIG. 8A shows that the first and second spectrograms 110 and 120 are unaligned with the third and fourth spectrograms 130 and 140. FIG. 8B shows the top view of the spectrograms aligned after applying the algorithm of the present invention. FIG. 8B shows that the two upper spectrograms are aligned with the two lower spectrograms. Markers on the top indicate the reference peaks used in the alignment of the spectrograms. FIGS. 9A and 9B show high resolution spectrograms before alignment and after alignment, respectively. In the high resolution, the alignment algorithm of the illustrative embodiment is so efficient that it can detect compounds in the samples that have been slightly shifted, which means that a protein might have suffered a structural transformation (e.g. phosphorylation, methylation, etc). Typically most of the spectrometry techniques are aimed to detect the quantity of certain compounds in a test sample. The present invention, however, detects structural transformations using mass-spectrometry. Biologically it is well known that structural transformations in proteins may indicate correlation to potential abnormal cells, such as in cancer. The present invention enables the mass spectrometry techniques to detect structural transformations by improving the alignment of the spectrometry data.

One of skill in the art will appreciate that different preprocessing steps, such as normalization, smoothing (or noise filtering) 260 and baseline correction (trend removal) may be applied before or after applying the alignment algorithm of the present invention. One of skill in the art will also appreciate that the alignment algorithm of the present invention can be used alone without the application of other preprocessing steps described above.

It will thus be seen that the invention attains the objectives stated in the previous description. Since certain changes may be made without departing from the scope of the present invention, it is intended that all matter contained in the above description or shown in the accompanying drawings be interpreted as illustrative and not in a literal sense. For example, the illustrative embodiment of the present invention may be practiced in any computational environment that provides data processing capabilities. Practitioners of the art will realize that the sequence of steps and architectures depicted in the figures may be altered without departing from the scope of the present invention and that the illustrations contained herein are singular examples of a multitude of possible depictions of the present invention.

What is claimed is:

1. In an electronic device, a method for aligning original spectrum data to a set of reference peaks using a warp function, the method comprising the steps of:

building synthetic spectrum data with pulses centered at the reference peaks; and shifting and scaling the synthetic spectrum data so that cross-correlation between the original spectrum data and the synthetic spectrum data is a maximum value over shifts and scales, wherein the warp function is estimated based on the shifting and scaling of the synthetic spectrum data.

2. The method of claim 1 wherein the method is performed in a mass spectrometer.

3. The method of claim 1, wherein the method is performed with at least one of surface-enhanced laser desorption ionization—time of flight (SELDI-TOF) mass spectrometry technology, matrix assisted laser desorption Ionization—time of flight (MELDI-TOF) mass spectrometry technology, liquid chromatography (LC) mass spectrometry technology and electro-spray ionization mass spectrometry technology.

4. The method of claim 1, wherein the pulse comprises a Gaussian pulse.

5. The method of claim 1, further comprising:

re-sampling the original spectrum data using the warp function.

6. The method of claim 4, wherein warp functions of multiple spectra are calculated in a distributed manner.

7. The method of claim 1, wherein the reference peak is entered by users.

8. The method of claim 1, wherein the reference peak is calculated to be such a value that a total amount of peak shifts of multiple spectra to the reference peak is a minimum value.

9. The method of claim 1 where the maximization of the cross-correlation between the observed spectrogram and the synthetic signal is an objective function associate with an optimization problem.

10. The method of claim 9, wherein the objective function is optimized over a two dimensional grid of possible shifts and scales.

11. The method of claim 9, wherein the objective function is optimized using a genetic algorithm or a direct search technique.

12. The method of claim 1, wherein the method is performed to detect structural transformations of compounds.

13. A system for aligning original spectrum data to a set of reference peaks using a warp function, the system comprising:

a first preprocessor for building synthetic spectrum data with pulses centered at the reference peaks, and shifting and scaling the synthetic spectrum data so that cross-correlation between the original spectrum data and the synthetic spectrum data is a maximum value over shifts and scales, wherein the warp function is estimated based on the shifting and scaling of the synthetic spectrum data.

14. The system of claim 13 wherein the first preprocessor is included in a mass spectrometer.

15. The system of claim 13, wherein the first preprocessor uses at least one of surface-enhanced laser desorption ionization—time of flight (SELDI-TOF) mass spectrometry technology, matrix assisted laser desorption Ionization—time of flight (MELDI-TOF) mass spectrometry technology, liquid chromatography (LC) mass spectrometry technology and electro-spray ionization mass spectrometry technology.

16. The system of claim 13, wherein the processor building synthetic spectrum data with one or more Gaussian pulses.

17. The system of claim 13, wherein the first preprocessor comprises:

a unit for re-sampling the original spectrum data using the warp function.

18. The system of claim 17, further comprising:

a second preprocessor processor coupled to the first preprocessor via a network, wherein the first and second preprocessors calculate warp functions of multiple spectra in a distributed manner.

19. The system of claim 13, wherein the first preprocessor enables a user to enter the reference peaks.

20. The system of claim 13, wherein the first preprocessor calculates the reference peaks so that a total amount of peak shifts of multiple spectra to the reference peaks is a minimum value.

21. The system of claim 13 where the maximization of the cross-correlation between the observed spectrogram and the synthetic signal is an objective function associate with an optimization problem.

22. The system of claim 21, wherein the first preprocessor optimizes the objective function over a two dimensional grid of the possible shifts and scales.

23. The system of claim 13, wherein the first preprocessor optimizes the objective function using a genetic algorithm.

24. The system of claim 13, wherein first preprocessor detects structural transformations of compounds.

25. A medium holding instructions executable in an electronic device for a method for aligning original spectrum data to a set of reference peaks using a warp function, the method comprising the steps of:

building synthetic spectrum data with pulses centered at the reference peaks; and shifting and scaling the synthetic spectrum data so that cross-correlation between the original spectrum data and the synthetic spectrum data is a maximum value over shifts and scales, wherein the warp function is estimated based on the shifting and scaling of the synthetic spectrum data.

26. The medium of claim 25 wherein the method is performed in a mass spectrometer.

27. The medium of claim 25 wherein the method is performed with at least one of surface-enhanced laser desorption ionization—time of flight (SELDI-TOF) mass spectrometry technology, matrix assisted laser desorption Ionization—time of flight (MELDI-TOF) mass spectrometry technology, liquid chromatography (LC) mass spectrometry technology and electro-spray ionization mass spectrometry technology.

28. The medium of claim 25, wherein the pulse comprises a Gaussian pulse.

29. The medium of claim 25, further comprising:

re-sampling the original spectrum data using the warp function.

30. The medium of claim 29, wherein warp functions of multiple spectra are calculated in a distributed manner.

31. The medium of claim 25, wherein the reference peak is entered by users.

32. The medium of claim 25, wherein the reference peak is calculated to be such a value that a total amount of peak shifts of multiple spectra to the reference peak is a minimum value.

33. The medium of claim 25 where the maximization of the cross-correlation between the original spectrum data and the synthetic signal is an objective function associate with an optimization problem.

34. The medium of claim 33, wherein the objective function is optimized over a two dimensional grid of possible shifts and scales.

35. The medium of claim 33, wherein the objective function is optimized using a genetic algorithm.

36. The medium of claim 25, wherein the method is performed to detect structural transformations of compounds.

* * * * *

UNITED STATES PATENT AND TRADEMARK OFFICE

CERTIFICATE OF CORRECTION

PATENT NO. : 7,365,311 B1
APPLICATION NO. : 11/221474
DATED : April 29, 2008
INVENTOR(S) : Lucio Cetto It is certified that error appears in the above-identified patent and that said Letters Patent is hereby corrected as shown below:

Column 1, line number 33, in the printed patent, please change “other source, of” to --other source of--

Column 4, line number 57, in the printed patent, please change “for example shift” to --for example, shift--

Column 4, line number 66, in the printed patent, please change “position and” to --position, and--

Column 6, line number 36, in the printed patent, please change “not limited to a” to --not limited to: a--

Column 6, line number 66, in the printed patent, please change “such as a” to --such as, a--

Column 8, line number 23, in the printed patent, please change “that although” to --that, although--

Signed and Sealed this

Twelfth Day of August, 2008

JON W. DUDAS
*Director of the United States Patent and Trademark Office*